April 20, 1926.
H. F. FLOWERS
1,581,435
CONVERTIBLE CAR AND TRACTOR
Filed April 2, 1924
3 Sheets-Sheet 1
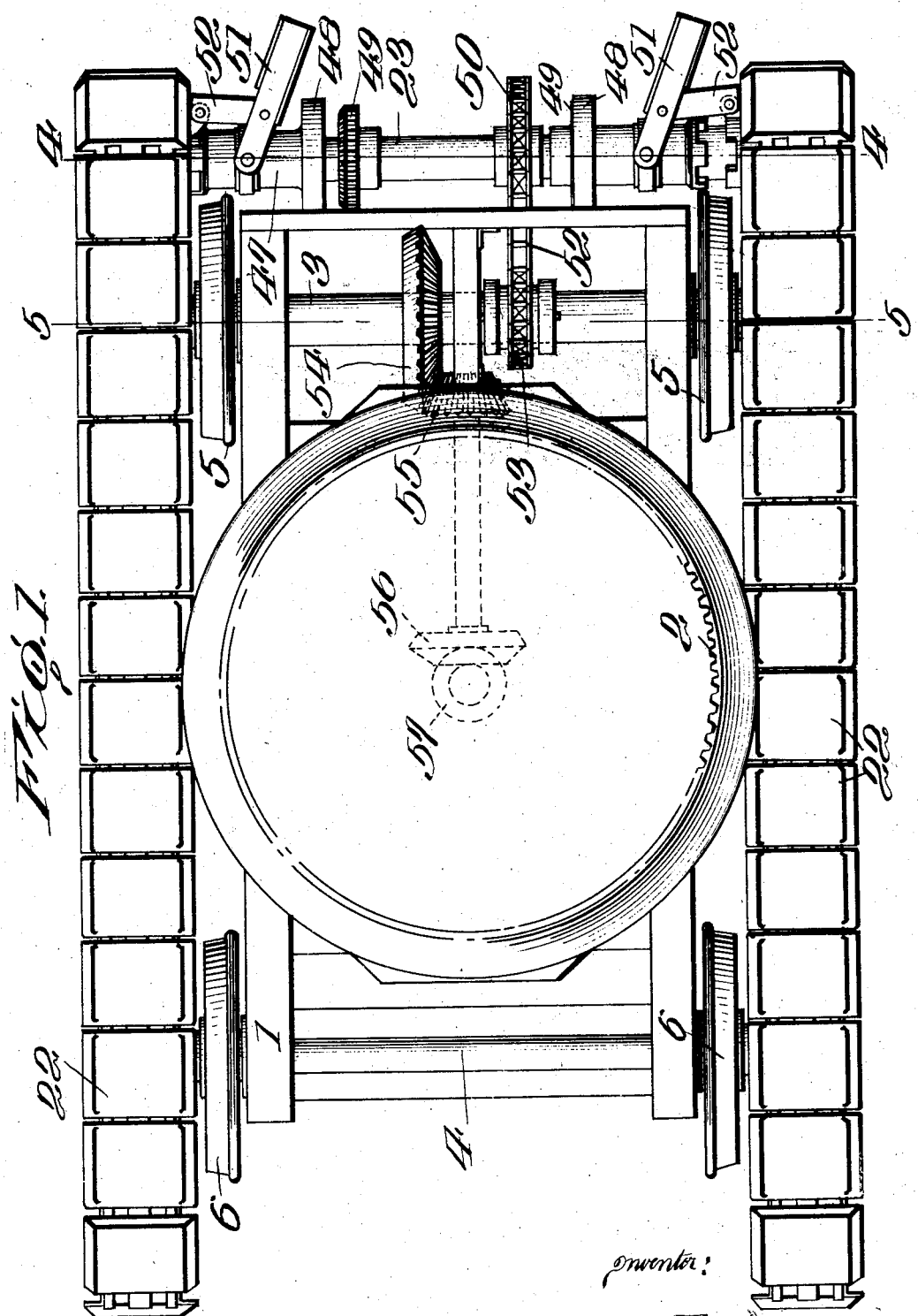

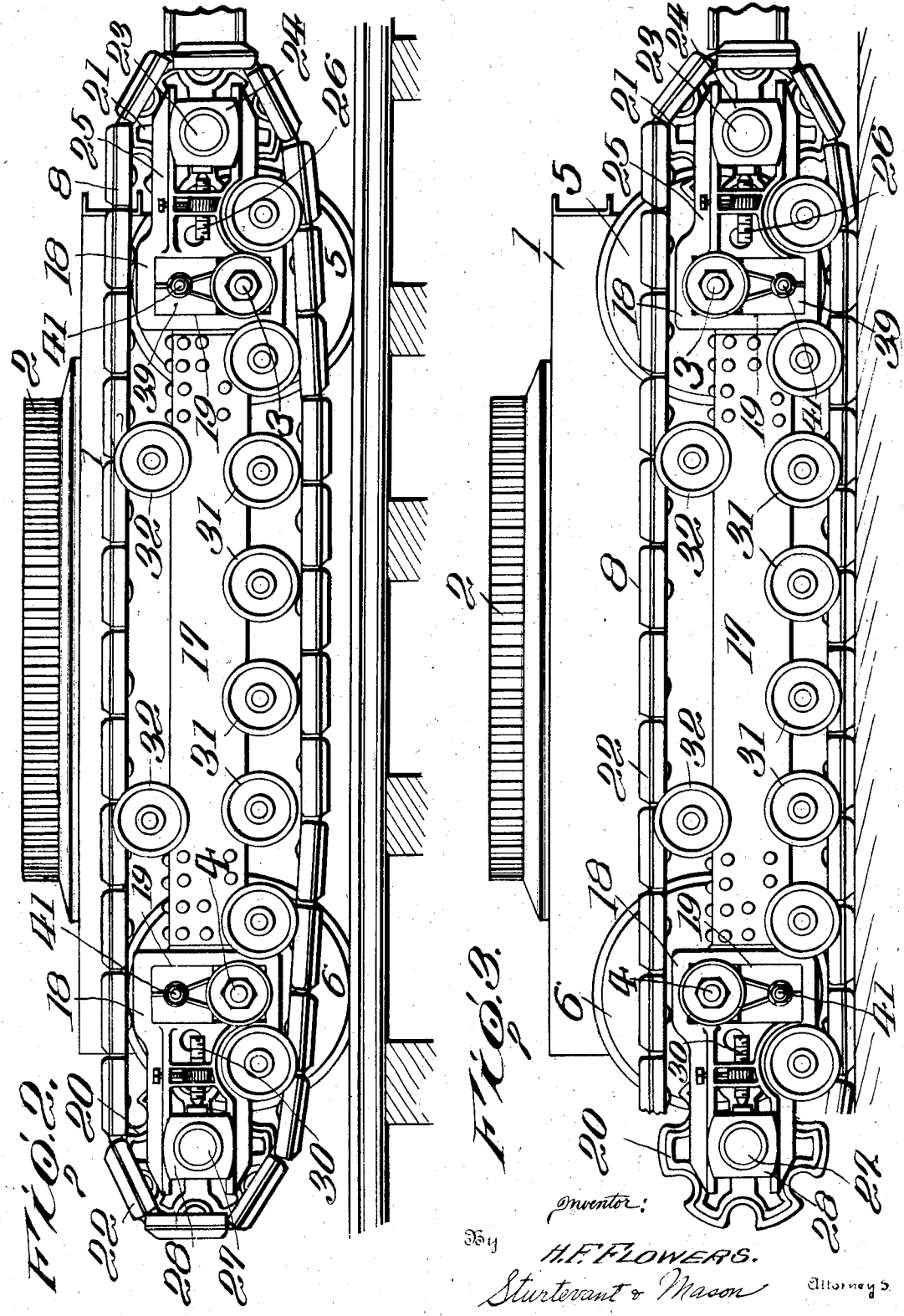

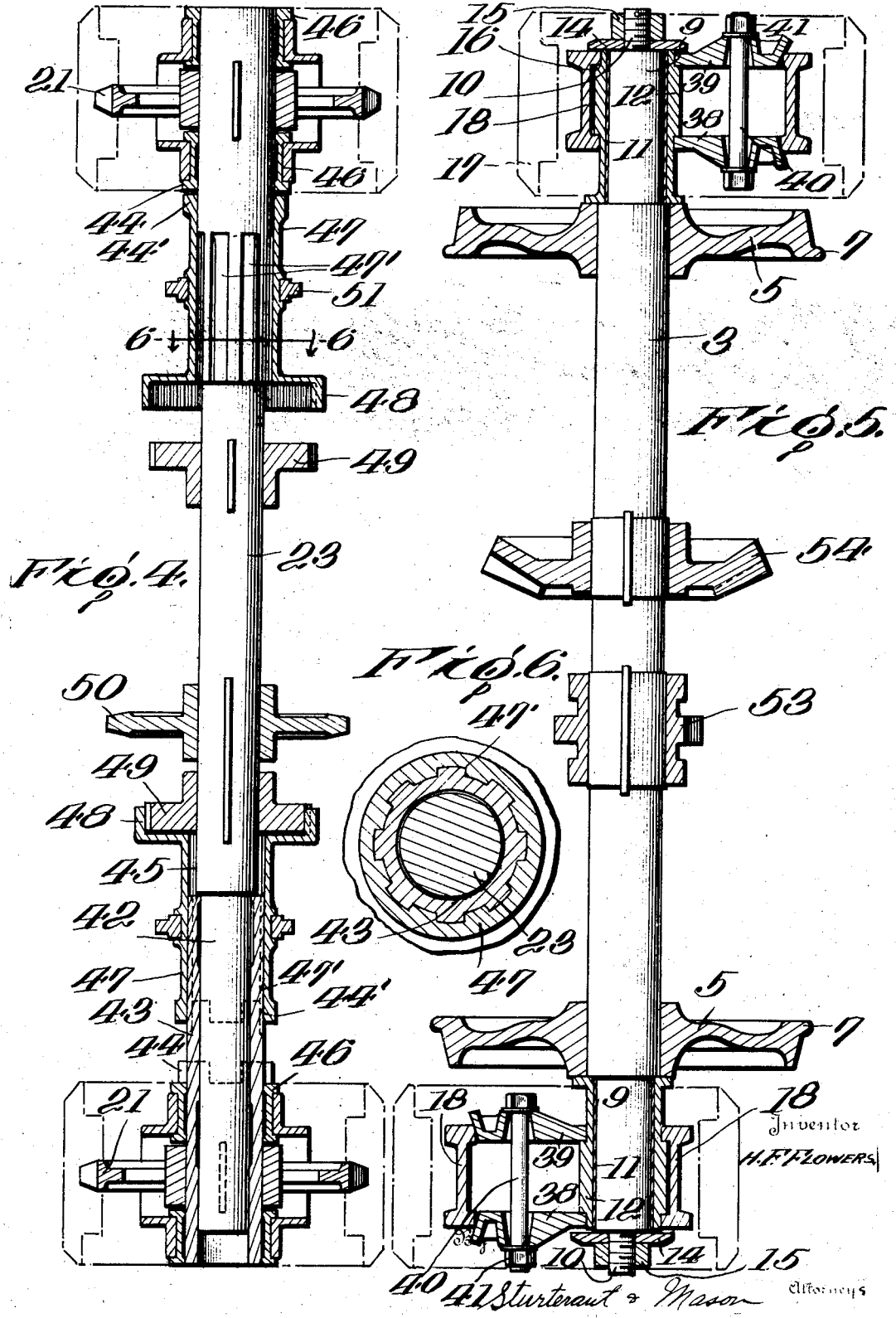

Patented Apr. 20, 1926.

1,581,435

UNITED STATES PATENT OFFICE.

HENRY FORT FLOWERS, OF FINDLAY, OHIO.

CONVERTIBLE CAR AND TRACTOR.

Application filed April 2, 1924. Serial No. 703,735.

*To all whom it may concern:*

Be it known that I, HENRY FORT FLOWERS, a citizen of the United States, residing at Findlay, in the county of Hancock, State of Ohio, have invented certain new and useful Improvements in Convertible Cars and Tractors, of which the following is a description, reference being had to the accompanying drawing and to the figures of reference marked thereon.

The invention relates to new and useful improvements in a convertible car and tractor wherein the car may be moved about upon supporting wheels running on tracks, or on the ground, or may be moved about upon tractor aprons which support the car with the wheels thereof free of the track or ground.

An object of the invention is to provide a convertible tractor and car of the above type with tractor aprons located one at each side of the car, and removable devices whereby the tractor aprons may be supported in ineffective position so that the car may run about on its supporting wheels, and whereby said tractors may be lowered and the car supported on the tractor aprons with the wheels thereof raised from the track or ground.

A further object of the invention is to provide a convertible tractor and car of the above type, which car is capable of being drawn as a trailer from one point to another on tracks therefor or ground, and with a propelling means for operating the tractor aprons so that the car may be moved about on the tractor aprons.

Yet another feature of this invention resides in the provision of means for connecting the source of power to either or both of the tractor aprons for driving and steering the tractor or in wholly disconnecting the aprons to tow the tractor on wheels.

These and other objects will in part be obvious and will in part be hereinafter more fully disclosed.

In the drawings which show by way of illustration one embodiment of the invention—

Figure 1 is a plan view of my improved device;

Fig. 2 is a side view with the tractor apron supported in raised position;

Fig. 3 is a side view with the tractor apron in lowered position;

Fig. 4 is a sectional view on the line 4—4 of Fig. 1 of the shaft for driving the tractor aprons;

Fig. 5 is a view on the line 5—5 of Fig. 1 of the wheel axle with the replaceable blocks in the two positions of adjustment, one on each end, and Fig. 6 is a section through line 6—6 of Fig. 4.

In carrying out the invention, I have provided an ordinary car structure which may be drawn about as a trailer and which consists of a body portion mounted on suitable axles carrying supporting wheels. These wheels are either flat or flanged wheels adapted to run either on roads or on tracks. The axles are extended beyond the flanged wheels, and on each axle there is an extension on which is mounted a journal. Extending from end to end at each side of the car are supporting frames for an endless tractor apron, there being one tractor apron at each side of the car. This supporting frame has wheels at the extreme ends over which the tractor apron runs, and these wheels are preferably adjustable in order to take up the slack in the tractor apron. The frame is also preferably provided with a series of wheels intermediate its ends at the lower side thereof, underneath which the tractor apron runs, and these supporting wheels backing up the tractor apron serve as a means for supporting the car when the tractor apron is in effective position. Each frame has a rectangular opening or housing which is adapted to receive respectively, a journal box. This housing is elongated and when the frame is raised so that the journal box is at the lower part of the housing, suitable devices are placed in the housing above the journal box so as to operate as a support for holding the frame in raised position, and thus the tractor apron in ineffective position, so that the car may run about on its wheels. When the journal is at the upper end of the housing, the same supporting devices may be placed underneath the journal and between the same and the end of the housing, and thus operate to support the car on the tractor, with the wheels of the car raised from the track.

Mounted on the body portion of the car is a floating axle which is adapted to be suitably driven by a motor also carried on the car body. A sprocket for driving the tractor apron is loosely mounted on each end of this axle and suitable clutches and locking devices are provided so that both tractor sprockets may be driven simultaneously or disconnected simultaneously by said axle when said tractor is power driven; both sprockets may be driven by said axle for forward going; or both disconnected for trailing. Or either sprocket may be power connected to turn to the right or left for steering, in the latter event, the sprocket not connected to the power axle is positively locked to a stationary part of the frame to facilitate the steering.

Referring more in detail to the drawings, my improved convertible tractor and car consists of a body portion 1 which in the present drawings is shown as having a turn table 2 on which may be mounted any suitable device, such as a shovel, derrick or the like. The body portion of the car is suitably mounted on axles 3 and 4. On the axle 3 there are wheels 5, one at each end thereof, and on the axle 4, there are similar wheels 6. These wheels may be provided with flanges 7 so that they are adapted to run on rails and the tractor drawn about as a trailer from one place to another. At each side of the car there are tractor aprons 8. These tractor aprons and the supports therefor are similar in construction, and the description of one will answer for both.

The axle 3 is provided with an extension 9 which is secured thereto preferably by having its inner end recessed and threaded so that it can be screwed on to the end 10 of the axle proper. Mounted on the axle and extension thereof is a bushing 11, and surrounding this bushing 11 is a journal box 12. On the end of the extension 9 is a plate or washer 14 and a threaded nut 15. Extending along each side of the car is a supporting frame 17. Said supporting frame is provided with a housing 18 having an elongated recess 19 therethrough, and the axle with its extension is located in this recess. The journal box 12 has its shoulders 16 fitting between flanges in the housing 18. The diameter of the journal box is considerably less than the length of the recess 19, so that the journal box can be shifted in the housing from one position in the recess to another. The journal box does not rotate in the frame 17, but is rigidly fixed therein. The sleeve 11 rotates in this journal box and this permits the axle with the wheels mounted thereon to rotate freely.

At one end of the frame 17 there is a supporting wheel 20, and at the other end there is a supporting wheel 21. The endless apron 22 extends about these supporting wheels and is driven by the wheel 21. The wheel 21 is mounted on an axle 23. This axle is journaled in bearings 24 at each end thereof and the bearings 24 are mounted in the forked end 25 of the frame so that they can be slid endwise of the frame. The adjusting bolts 26 are provided for moving the bearings 24. At the other end of the frame, the wheel 20 is carried by a short axle 27 which is likewise mounted in bearings 28 and these bearings are capable of being shifted in the forked end of the frame by means of an adjusting bolt 30.

It will readily be seen that the axles 23 and 27 can be adjusted toward and from each other for the purpose of taking up the slack in the tractor apron 22. Mounted at suitable intervals along the frame 17 are wheels 31. These wheels are idlers and are mounted in suitable bearings carried by the frame 17. These wheels are on the upper face of the tractor apron and serve as a means for carrying the weight of the car. There are also wheels 32 over which the upper strand of the tractor apron runs which support said apron intermediate its ends.

When the journal box 12 is at the lower end of the elongated recess in the housing 18, plates 38 and 39 are placed between the journal box and the upper end of the recess in the housing. These plates are provided with suitably flanged upper ends for this purpose. A bolt 40 is passed through the plates and a nut 41 together with the head of the bolt will clamp these plates 38 and 39 in place. It will readily be seen that these plates operate to hold the frame 17 in raised position and thus the endless tractor apron at a point above the lower part of the wheels 5 and 6 as clearly shown in Fig. 2 of the drawings. The tractors are now in ineffective position and the car may be drawn about on a suitable track therefor. When it is desired to remove the car from the track, the wheels of the car are preferably jacked up in some suitable way, the plates 38 and 39 are removed, and the frame drops to its lower position as shown in Fig. 3. These plates are then inverted and again placed between the journal box 12 and the lower end of the recess in the housing 18. These plates when clamped in position will now operate as a support for the axles of the car, and thus the weight of the car is carried by the frame 17, and through the frame 17 carried by the tractor aprons. As soon as the car has been jacked up and the tractor aprons put into effective position, the car may be run in any direction regardless of tracks therefor.

Means is provided for driving the tractor treads from a desired source of power so that the treads will be effective to propel the machine forwardly or backwardly in a straight line, or to the right or left as when it is desirable to steer the device. To this end, it is desirable to utilize the floating shaft 23 as the driving shaft, and while in some installations this driving shaft may be driven direct from the power plant it is preferred to drive it from the axle 3 as shown in the drawings, for the reason that it permits using a short sprocket chain and requires very little force to drive the railway wheels when they are suspended in the air. It also permits an additional reduction in gear ratio when the apparatus is operated on the continuous treads. It is invariably desirable to move very slowly when on continuous treads.

Referring now to Fig. 4 in particular, it will be observed that the shaft 23 at each end is provided with a reduced portion 42 on which is journaled a sleeve 43. This sleeve extends inwardly as far as the shoulder 45 and has its bearing in the stationary frame 46 for supporting the continuous tread. The sleeve at its end has rigidly mounted thereon the sprocket 21 for driving the tread. The inner face of each frame 46 is formed with a castellated locking surface 44 to engage a cooperatively shaped surface 44' on a clutch sleeve 47 which is slidingly splined as at 47' on the sleeve 43. It is to be understood that each end of the shaft 23 is provided with similar constructions of locking members and sliding clutches so that in the future description, only one will be mentioned. In Fig. 4 the uppermost sleeve 47 is shown in full lines, whereas, the lower sleeve is shown in section. The sliding clutch sleeve 47 is formed on its opposite end with a clutch member 48 which slidably engages with a cooperative clutch member 49 keyed rigidly to shaft 23. Adjacent this clutch member, shaft 23 has keyed thereto the sprocket wheel 50. Each sliding clutch sleeve 47 is moved to the right or left by means of a lever 51 connected thereto and these levers are in turn pivoted to a bracket 52 carried on the frame 46.

The sprocket wheel 50 is driven by means of the chain 52 running over the smaller sprocket 53 fast on the axle 3. This axle is in turn driven by the bevel gears 54 and 55 and the bevels 56 and 57 mounted on suitable shafts shown in dotted lines in the drawings. The final shaft of this driving series is obviously connected to the driving motor or other prime mover.

In operation it might be stated that the sliding clutch sleeve 47 slides toward the center (see Fig. 4) so that the clutch member 48 engages the clutch member 49. In this position the clutch sleeve is connected up with the shaft 23. Inasmuch as sleeve 47 is splined to the sleeve 43 on the shaft which latter sleeve has fixed thereto the traction tread driving sprocket 21, the latter will be driven positively. On the other hand, if the sliding clutch sleeve 47 is slid outwardly, as shown in the upper portion of Fig. 4, the sliding sleeve is locked to the frame of the machine by means of the castellated locking surfaces. In this event the particular tread so engaged is positively held from movement. This is utilized for turning a corner and in such case the opposite tread is placed in power driving engagement as hereinbefore described. In certain instances, the sleeve will be thrown in a central or neutral position in which case it engages neither the clutch nor the locking surface and as a consequence the treads so desired will remain wholly disconnected and motionless. This is necessary when the apparatus is rolling along on the wheels 4 and 5 as a trailer. It will be seen that this locking means not only permits towing but it also permits releasing the clutch before the lock is engaged and thereby making the shifting easier.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A convertible car and tractor including in combination, a body portion, wheels carried by said body portion for movably supporting it, an endless tractor apron at each side of the car, shiftable bodily vertically from effective position for supporting the car with the wheels raised from the track to ineffective position wherein the car may be supported on said wheels, and removable devices for supporting the tractor apron in raised position on the car and for supporting the car on the tractor apron in lowered position.

2. A convertible car and tractor including in combination, a body portion, axles on which said body portion is mounted, wheels carried by the axles, extensions mounted on said axles, and an endless tractor apron at each side of the car mounted on the extended axles and shiftable bodily vertically from effective position for supporting the car with the wheels raised to ineffective position, wherein the car may be supported on the wheels, and removable devices associated with the tractor apron for holding the same in raised position on the car and for supporting the car on the tractor aprons when the same are lowered.

3. A convertible car and tractor including in combination, a body portion, axles on which said body portion is mounted, wheels carried by the axles, each axle having an extension, a frame at each side of said car, an endless tractor associated with each frame, and removable devices for supporting the frames on said axles with the aprons in ineffective position and for supporting said axles on the tractor aprons with the wheels of the car in ineffective position.

4. A convertible car and tractor including in combination, a body portion, axles on said body portion on which said body portion is mounted, wheels carried by the axles, each axle having an extension, a frame at each side of said car, an endless tractor apron associated with each frame, said frames having a housing through which the axle extensions extend, a journal on each axle located in the housing therefor, said housing being elongated so that the journal may be shifted lengthwise thereof, and devices for securing said journal either at the lower end of the housing or the upper end of the housing whereby said frame may be held in ineffective position with the apron raised above the lower part of the wheels or held in effective position with the wheels raised above the apron so that the car may be supported on the aprons.

5. A convertible car and tractor including in combination, a body portion, axles on said body portion on which said body portion is mounted, wheels carried by the axles, each axle having an extension, a frame at each side of said car, an endless tractor apron associated with each frame, each frame having a housing through which the axle extensions extend, a journal on the axle located in the housing, said housing being elongated so as to permit the journal to be shifted lengthwise thereof, a pair of supporting plates adapted to fit between the journal and the upper end of the housing, or between the journal and the lower end of the housing for holding said journal in one end or the other of the housing, and a clamping bolt for holding said plates in place.

6. A convertible car and tractor including in combination a body portion, axles on said body portion on which said body portion is mounted, wheels carried by the axles, each axle having an extension, a frame at each side of said car, an endless tractor apron associated with each frame, each frame having a housing through which the axle extensions extend, a journal on the axle located in the housing, said housing being elongated so as to permit the journal to be shifted lengthwise thereof, a pair of supporting plates adapted to fit between the journal and the upper end of the housing, or between the journal and the lower end of the housing for holding said journal in one end or the other of the housing, a clamping bolt for holding said plates in place, an axle connecting the wheels at one end of the frames, a motor carried by the body of the car, and devices actuated by the motor for operating the axle, said devices being constructed so as to permit the endless aprons to be raised and lowered without interfering with the driving mechanism therefor.

In testimony whereof, I affix my signature.

HENRY FORT FLOWERS.